(12) United States Patent
McFall et al.

(10) Patent No.: US 11,115,493 B2
(45) Date of Patent: *Sep. 7, 2021

(54) SYSTEMS AND METHODS FOR DECREASING LATENCY IN DATA PACKET PROVISION

(71) Applicant: Pearson Education, Inc., Bloomington, MN (US)

(72) Inventors: Gregory Dean McFall, Poolesville, MD (US); Yaohang Hong, Windermere, FL (US)

(73) Assignee: PEARSON EDUCATION, INC., Bloomington, MN (US)

(*) Notice: Subject to any disclaimer, the term of this patent is extended or adjusted under 35 U.S.C. 154(b) by 84 days.

This patent is subject to a terminal disclaimer.

(21) Appl. No.: 16/379,631

(22) Filed: Apr. 9, 2019

(65) Prior Publication Data
US 2019/0238655 A1    Aug. 1, 2019

Related U.S. Application Data

(63) Continuation of application No. 14/757,641, filed on Dec. 22, 2015, now Pat. No. 10,306,009.

(51) Int. Cl.
| | |
|---|---|
| *H04L 29/08* | (2006.01) |
| *G06F 16/9535* | (2019.01) |
| *G06F 16/2457* | (2019.01) |
| *H04L 12/859* | (2013.01) |
| *H04L 12/841* | (2013.01) |

(52) U.S. Cl.
CPC ...... *H04L 67/306* (2013.01); *G06F 16/24578* (2019.01); *G06F 16/9535* (2019.01); *H04L 47/2475* (2013.01); *H04L 47/283* (2013.01); *H04L 67/22* (2013.01); *H04L 67/2847* (2013.01)

(58) Field of Classification Search
None
See application file for complete search history.

(56) References Cited

U.S. PATENT DOCUMENTS

| | | | | |
|---|---|---|---|---|
| 8,535,059 | B1* | 9/2013 | Noble, Jr. | G09B 5/00 434/219 |
| 8,834,175 | B1* | 9/2014 | Daddi | G09B 5/00 434/323 |
| 9,658,882 | B1* | 5/2017 | Fullmer | H04N 21/4667 |
| 2002/0128908 | A1* | 9/2002 | Levin | G06Q 30/02 705/14.53 |
| 2006/0040247 | A1* | 2/2006 | Templin | G09B 7/00 434/362 |

(Continued)

*Primary Examiner* — Nicholas Sloms
(74) *Attorney, Agent, or Firm* — Quarles & Brady LLP

(57) ABSTRACT

A system and method for decreasing latency in providing a data packet to a user device subsequent to receipt of an electronic signal from the user device are disclosed herein. The system can include memory including: a user profile database; and a content library database. The system can include a user device including: a network interface; and an I/O subsystem. The system can include a content management server. The content management server can: provide a data packet to the user device; request generation of a contingent recommendation; receive the contingent recommendation; receive an electronic signal including a user response; select a next action; and provide the next action to the user device.

20 Claims, 14 Drawing Sheets

(56) References Cited

U.S. PATENT DOCUMENTS

| | | | |
|---|---|---|---|
| 2010/0299161 A1* | 11/2010 | Burdick | G06Q 10/087 705/4 |
| 2012/0084364 A1* | 4/2012 | Sivavakeesar | H04L 51/20 709/205 |
| 2012/0110579 A1* | 5/2012 | Bullen | G06Q 10/10 718/100 |
| 2014/0295957 A1* | 10/2014 | Supanc | A63F 13/00 463/29 |
| 2015/0213467 A1* | 7/2015 | Sanghavi | G06Q 30/0203 705/7.32 |
| 2015/0281163 A1* | 10/2015 | Bastide | G06Q 10/10 709/206 |
| 2016/0180355 A1* | 6/2016 | Amano | G06Q 30/0201 705/7.31 |
| 2016/0379129 A1* | 12/2016 | Assem Aly Salama | G06Q 30/0282 706/52 |
| 2017/0017519 A1* | 1/2017 | Khan | H04L 51/02 |

* cited by examiner

SYSTEMS AND METHODS FOR DECREASING LATENCY IN DATA PACKET PROVISION

CROSS-REFERENCE TO RELATED APPLICATIONS

This application is a continuation of U.S. application Ser. No. 14/757,641, filed on Dec. 22, 2015, and entitled "SYSTEMS AND METHODS FOR DECREASING LATENCY IN DATA PACKET PROVISION", the entirety of each of which is hereby incorporated by reference herein.

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

BRIEF SUMMARY

One aspect of the present disclosure relates to a system for decreasing latency in providing a data packet to a user device subsequent to receipt of an electronic signal from the user device. The system includes memory including: a user profile database containing data identifying one or several historic attributes of the user; and a content library database including a plurality of data packets. In some embodiments, each of the plurality of data packets includes a prompt for a user response and response data for evaluation of the user response. The system can include a user device including: a network interface that can exchange data with a server via a communication network; and an I/O subsystem that can convert electrical signals to user interpretable outputs user interface. The system can include a content management server. The content management server can include computer code that, when executed, directs the content management server to: provide a data packet to the user device, which data packet includes one of the plurality of data packets in the content library database; request generation of a contingent recommendation, which contingent recommendation includes a plurality of potential next actions. In some embodiments, each of the plurality of potential next actions is based on at least one possible user response to the provided data packet. The content management server can include computer code that, when executed, directs the content management server to: receive the contingent recommendation; and receive an electronic signal including a user response to the provided data packet from the user device; select a next action, which next action includes one of the potential next actions. In some embodiments, the next action is selected based on the received user response and the received contingent recommendation. The content management server can include computer code that, when executed, directs the content management server to provide the next action to the user device.

In some embodiments, the content management server includes a recommendation engine, a presentation engine, and a response processor. In some embodiments, one or more of the recommendation engine, the presentation engine, and the response processor can be embodied in hardware, and in some embodiments, one or more of the recommendation engine, the presentation engine, and the response processor can be embodied in software. The presentation engine can: receive a request for a data packet from the user device; and retrieve the data packet from the content item library. In some embodiments, the presentation engine can: identify data components within the data packet, which data components include a presentation component for providing to the user device and a response component; generate a delivery data packet, which delivery data packet does not include the response component; and provide the delivery data packet to the user device.

In some embodiments, the presentation engine can provide the response component of the data packet to the response processor. In some embodiments, the response processor can: receive the response component of the data packet; receive a response from the user device; and determine whether the received response is a desired response by comparing the received response to the received response component of the data packet. In some embodiments, the recommendation engine can: receive the request for generation of the contingent recommendation from the presentation engine; generate the contingent recommendation; and provide the contingent recommendation to the presentation engine.

In some embodiments, generating the contingent recommendation includes: identifying the data packet; determining potential outcomes for a response to the data packet; and generating a recommendation for each of the potential outcomes. In some embodiments, generating the outcome further includes: determining the likelihood of each of the potential outcomes; ranking the potential outcomes based on likelihood; and generating a recommendation for each of the potential outcomes based on ranking. In some embodiments, generating a recommendation for each of the potential outcomes based on ranking includes: generating contingent user data, which contingent user data is the user data updated according to a selected one of the potential outcomes; and identifying a contingent next item based on the contingent user data.

One aspect of the present disclosure relates to a method for decreasing system latency. The method includes: receiving an electronic signal including a user identifier from a user device, which user identifier identifies a user; retrieving user data associated with the user identifier from a user profile database, which user data includes data identifying one or several historic attributes of the user; providing a data packet to the user device, which data packet includes a request for a user input in response to the data packet; and requesting generation of a contingent recommendation. In some embodiments, the contingent recommendation includes a plurality of potential next actions. In some embodiments, each of the plurality of potential next actions is based on at least one possible user response to the provided data packet. The method can include receiving the contingent recommendation; receiving an electronic signal including a user response to the provided data packet from the user device; and selecting a next action, which next action includes one of the potential next actions. In some embodiments, the next action is selected based on the received user response and the received contingent recommendation. The method can include providing the next action to the user device.

In some embodiments, the method includes: receiving a request for a data packet from the user device at a presentation engine; and retrieving the data packet from the content item library. In some embodiments, the method includes: identifying data components within the data packet, which data components include a presentation component for providing to the user device and a response component; generating a delivery data packet, which delivery data packet does not include the response component; and providing the delivery data packet to the user device. In some embodiments, the method includes receiving the response component of the data packet at a response processor from the presentation engine.

In some embodiments, the method includes: receiving a response from the user device at the response processor; and determining with the response processor whether the received response is a desired response by comparing the received response to the received response component of the data packet. In some embodiments, the method includes: receiving the request for generation of the contingent recommendation from the presentation engine at a recommendation engine; generating the contingent recommendation with the recommendation engine; and providing the contingent recommendation to the presentation engine from the recommendation engine.

In some embodiments, generating the contingent recommendation includes: identifying the data packet; determining potential outcomes for a response to the data packet; and generating a recommendation for each of the potential outcomes. In some embodiments, generating the outcome further includes: determining the likelihood of each of the potential outcomes; ranking the potential outcomes based on likelihood; and generating a recommendation for each of the potential outcomes based on ranking. In some embodiments, generating a recommendation for each of the potential outcomes based on ranking includes: generating contingent user data, which contingent user data is the user data updated according to a selected one of the potential outcomes; and identifying a contingent next item based on the contingent user data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
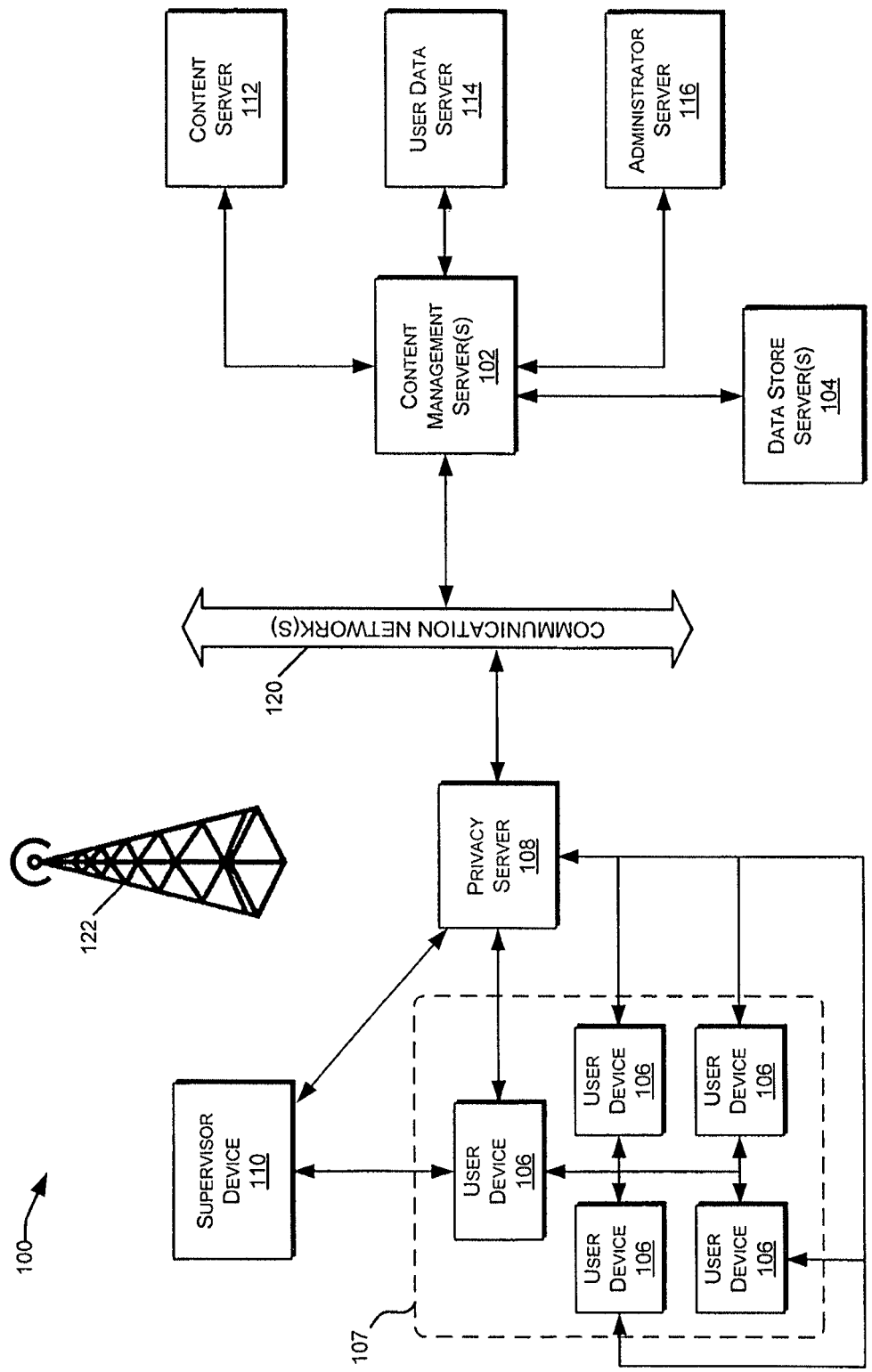
FIG. 1 is a block diagram illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radiofrequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
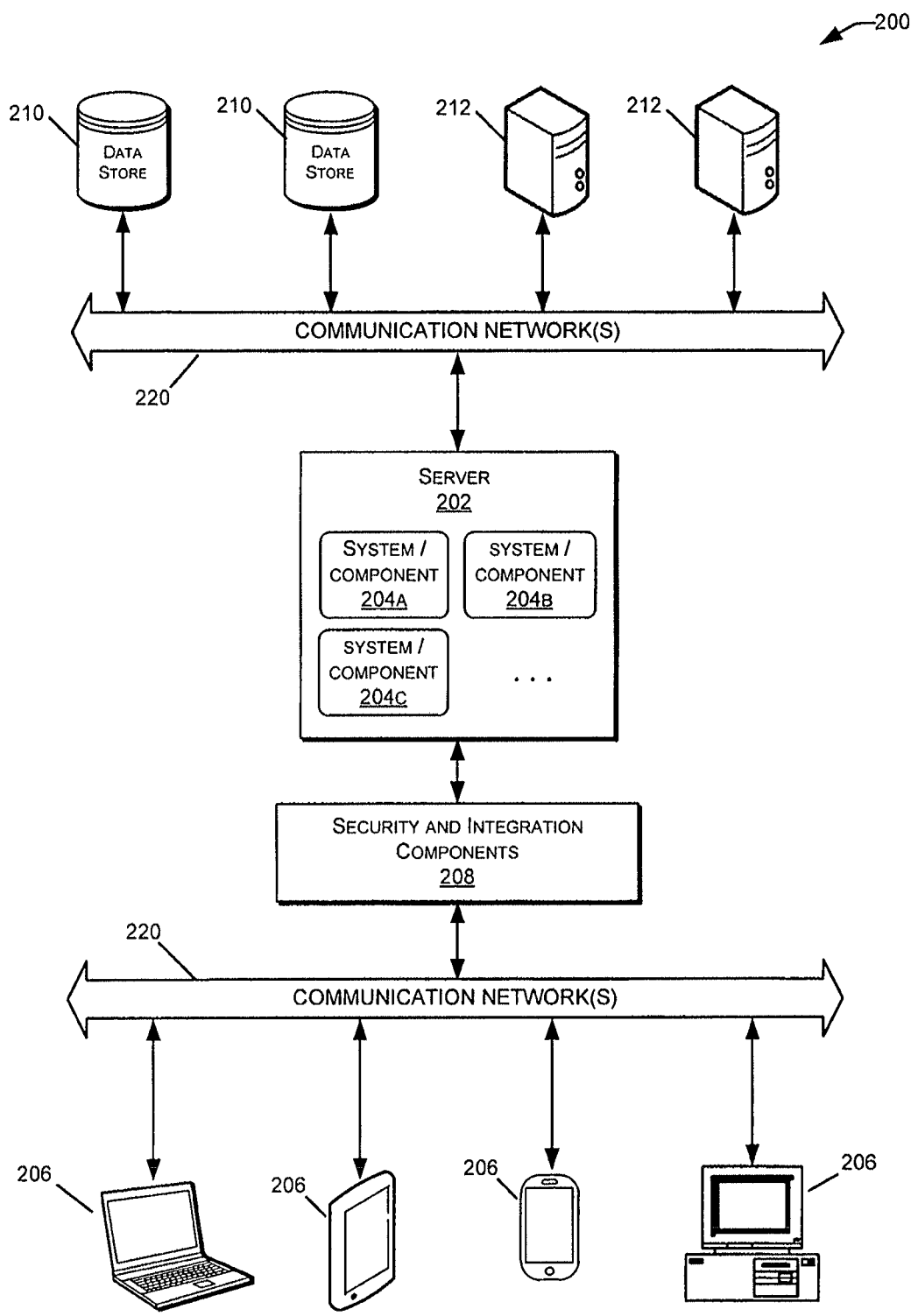
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or backend servers 212. In certain examples, the data stores 210 may correspond to data store server(s) 104 discussed above in FIG. 1, and back-end servers 212 may correspond to the various backend servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
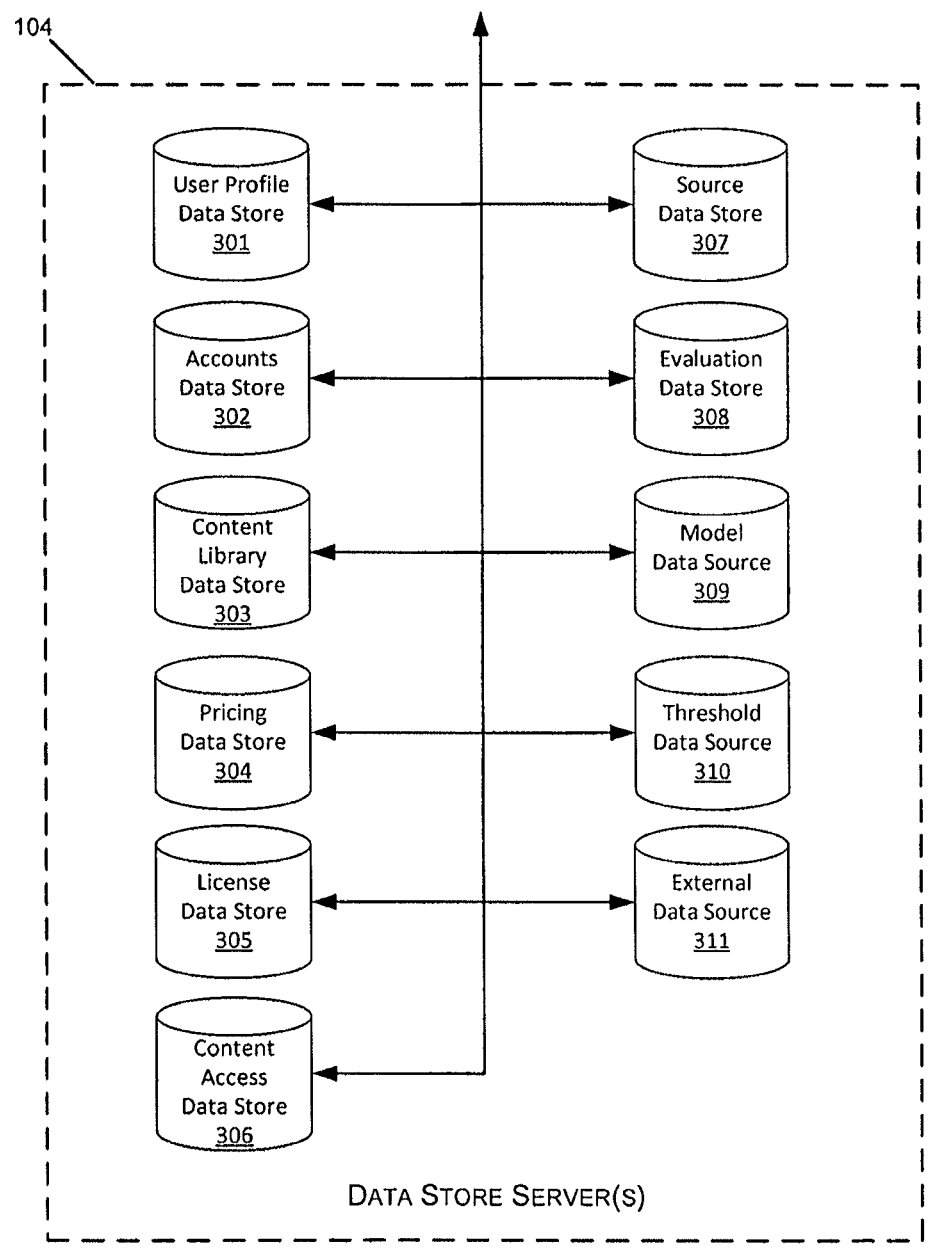
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model functions values. In some embodiments, these one or several model function values can be used to calculate a risk probability, which risk probability can characterize the risk of a user such as a student-user failing to achieve a desired outcome such as, for example, failing to achieve a desired level of completion of a program, for example in a predefined time period. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are Jess than the desired level of completion of the program. Specifically, in some embodiments, these completion status can be selected to all be at Jess than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4A:
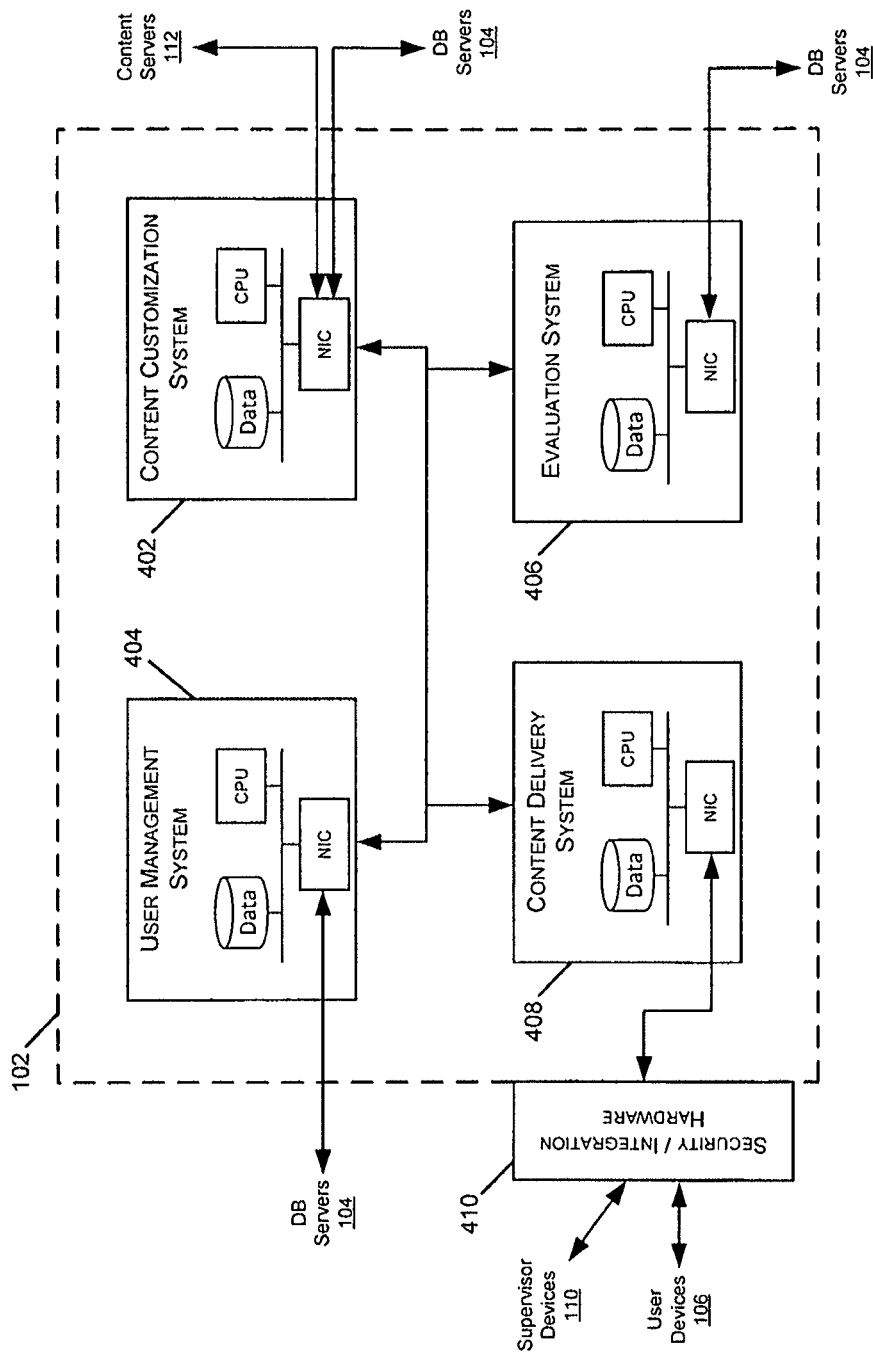
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408 also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
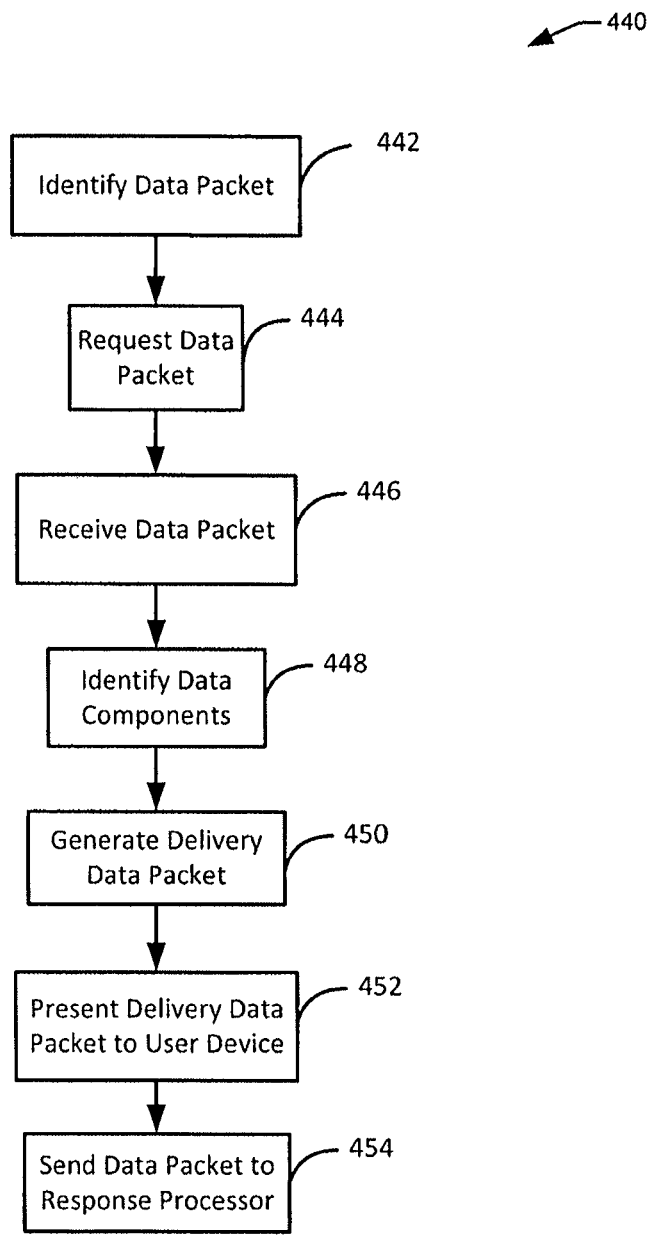
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
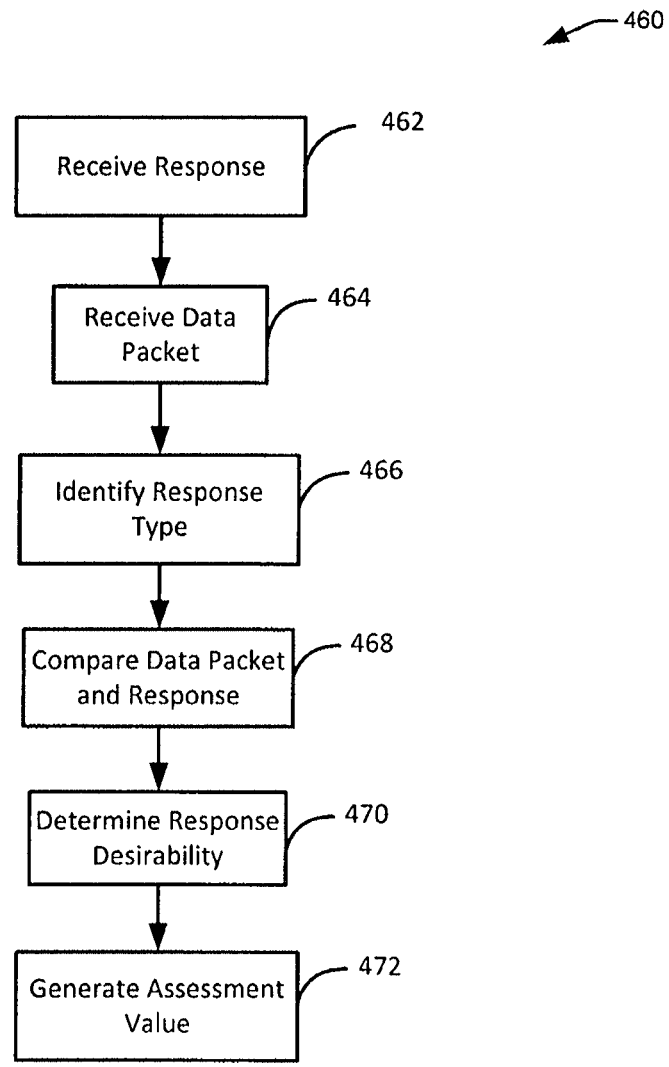
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
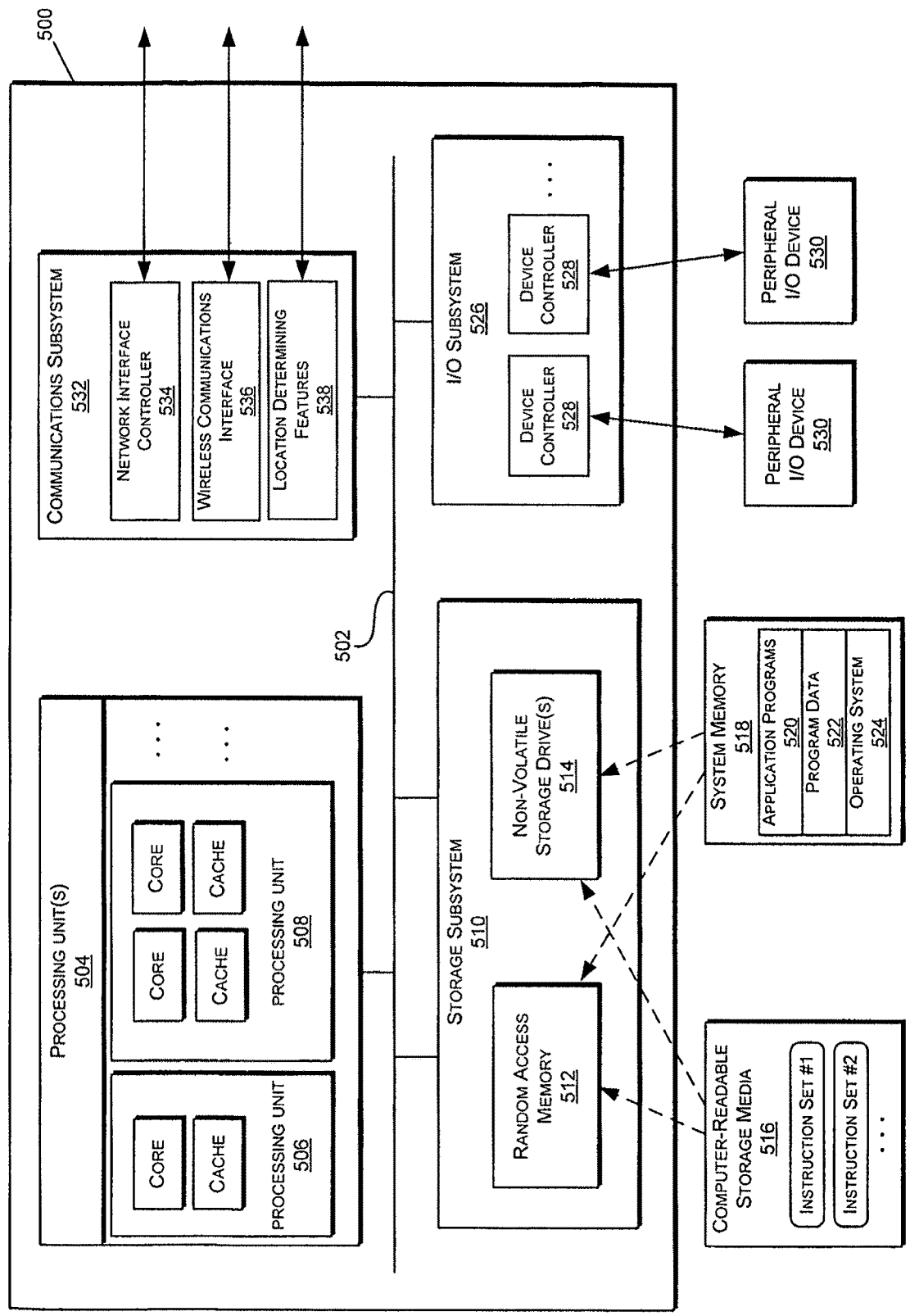
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE PI386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multi core processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from of writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a Fire Wire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
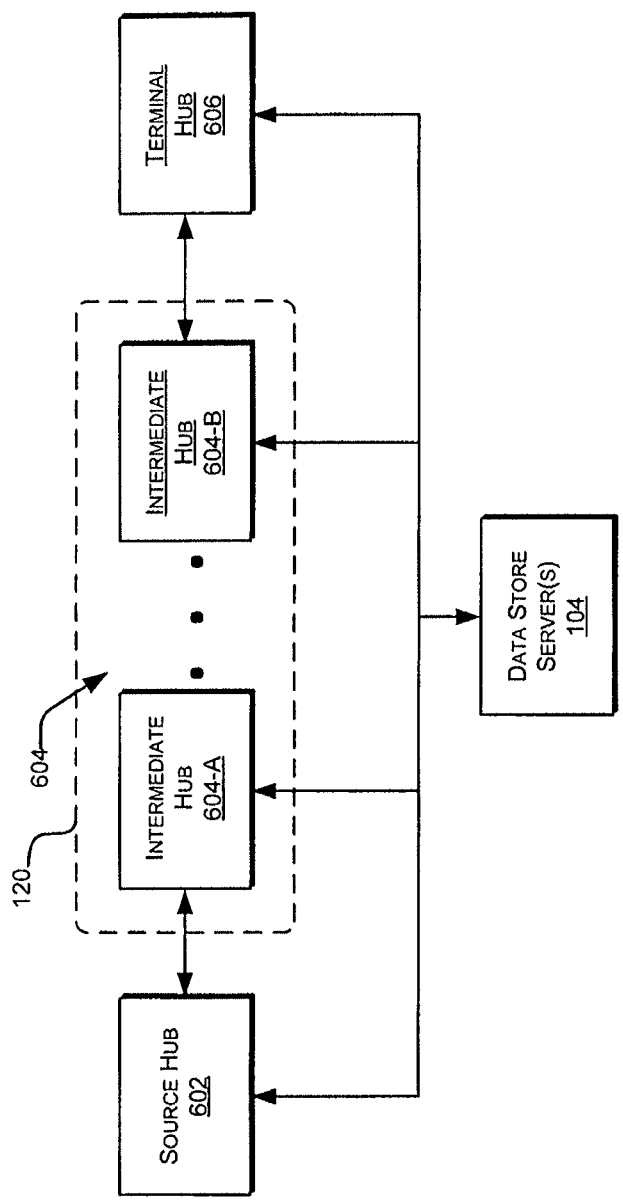
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
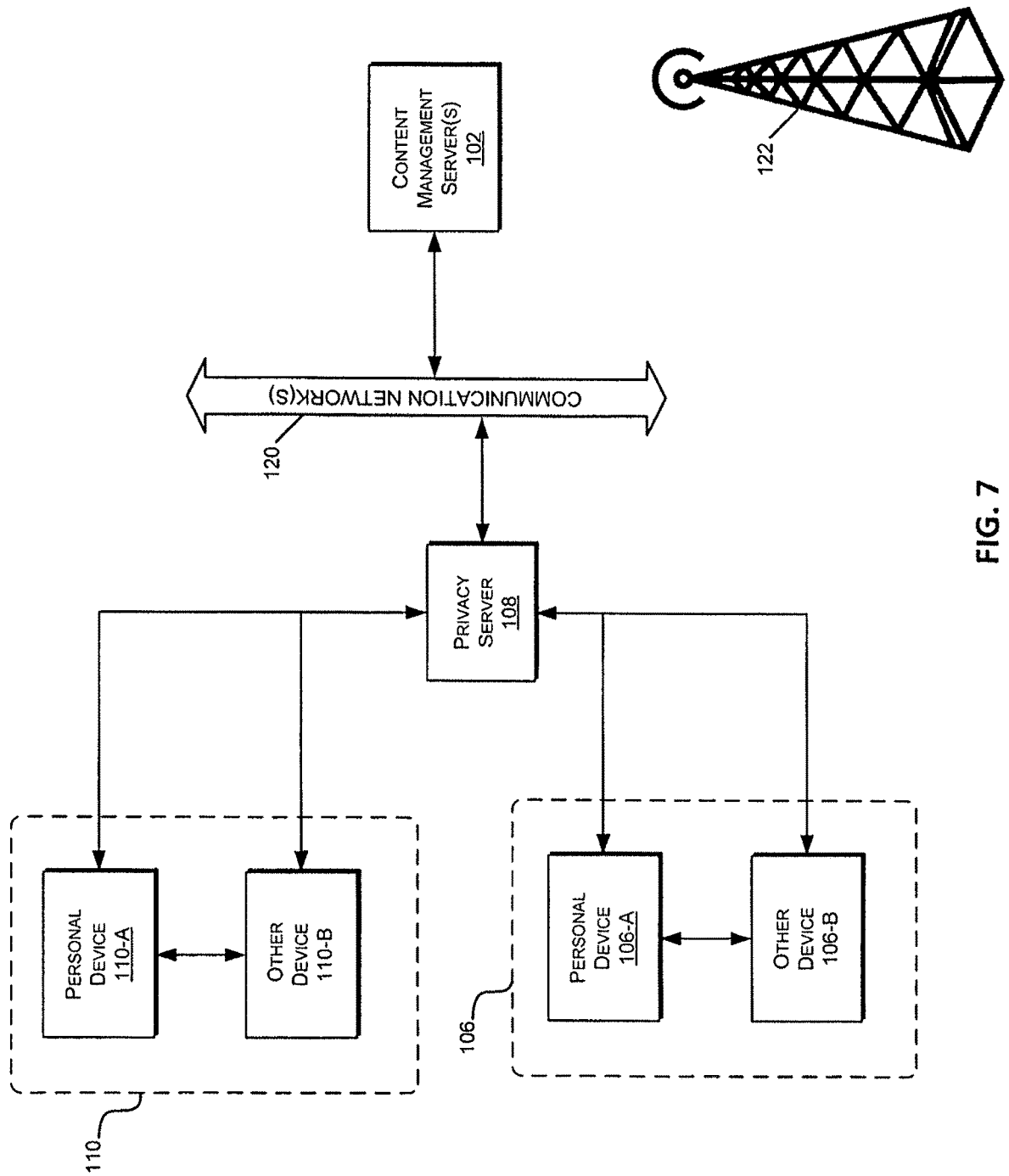
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using another device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

In some embodiments, the content distribution network 100 can provide data packet to a user. The data packets that are provided to the user can be selected using the evidence model. The evidence model can receive values characterizing one or several attributes of the user, such as the user's skill level, and can receive values characterizing one or several attributes of a data packet, such as the difficulty level of the data packet. Based on these received values, the evidence model, as executed by the content management server 102 can output a likelihood of the user associated with the input values providing a desired response to the data packet. In some embodiments, this likelihood can be compared to one or several thresholds to match the data packet to the user and to select one of the data packets for providing to the user.

The selected data packet can then be provided to the user, and the process can be repeated until a content program is completed. In such an embodiment, additional data packets can be selected after the user has provided a response, which can result in latency as the processing time required to select a data packet for providing to the user can be significant. In some embodiments, a contingent recommendation can be generated during the time the user has the data packet and before a user response is received. This contingent recommendation can include a plurality of contingent next items, with each contingent next item associated with an identified possible outcome. In such an embodiment a possible outcome represents a possible assessment result of the user provided response such as desired or undesired, correct or incorrect, or the like. By generating the contingent recommendation before the user provides a response, system latency is minimized. This further provides the benefit of, in effect increasing processing speeds by distributing processing loads. Thus, the content distribution network is able to more quickly perform the computations and execute the algorithms and steps to provide next data packets to users.

Figure 8:
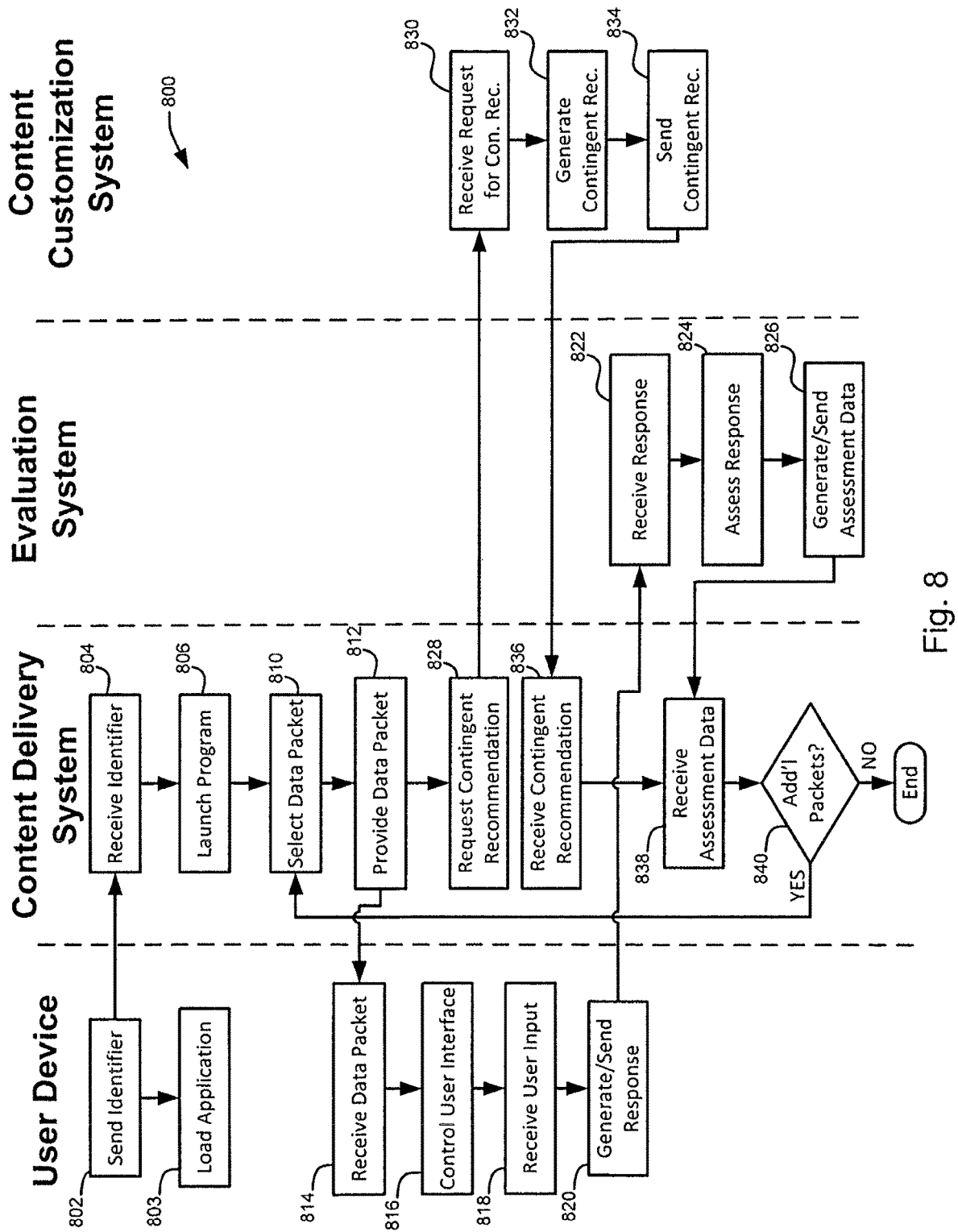
FIG. 8 is a swim lane diagram showing one embodiment of a process for decreasing latency in providing a data packet to a user device subsequent to receipt of an electronic signal from the user device.

With reference now to FIG. 8, a swim lane diagram showing one embodiment of a process 800 for decreasing latency in providing a data packet to a user device subsequent to receipt of an electronic signal from the user device is shown. The process can be performed by the components of the content distribution network 100, and particularly by, for example, the content management server 102, one or several user devices 106, and/or one or several supervisor devices 110.

The process 800 begins at block 802, wherein the user device 106 generates and electronic message containing a user identifier and sends the electronic message to the content delivery system 408. The user identifier can include information identifying the user such as, for example, a user login and password, a unique user identifier, or the like. In some embodiments, the electronic message can be sent in the form of an electronic signal via, for example, the communication network. The electronic message can be generated by the user device 106 based on information received form the user via, for example, the I/O subsystem 526.

In some embodiments, the user device 106 can also launch and/or load an application, as indicated in block 803. The application can be configured to allow the user to access one or several data packets via the user device.

The electronic message can be received by the content management server 102, and specifically by the content delivery system 408 at block 804. In some embodiments, the content delivery system 804 can receive the user identifier and can use the user identifier to retrieve information from one of the databases 104 such as the user profile database 301, which retrieved information can be, for example, data identifying one or several historic attributes of the user associated with the user identifier.

After the user identifier is received, the process 800 proceeds to block 806, wherein the content program is launched. In some embodiments, the content program can identify an aggregate of content and/or data packets for providing to the user device. In some embodiments, the launch of the content program can correspond to the identifying of data packets in the content program, determining the user's progress through the content program, or the like. The content program can be identified based on the user data retrieved from the user profile database 301. After the content program has been launched, the process 800 proceeds to block 810, wherein a data packet is selected. In some embodiments, the data packet can be selected based on information received from, for example, the content customization system and/or information stored within the user data retrieved from the user profile database 301.

After the data packet has been identified, the process 800 proceeds to block 812, wherein the data packet is provided to, for example, the user device 106. In some embodiments, providing the data packet to the user device can include generating an electronic message containing the data packet and/or containing portions of the data packet. In some embodiments, the providing of the data packet to the steps depicted in process 440 of FIG. 4B. After the data packet has been provided to the user device 106, the process 800 can proceed to block 814, wherein the data packet and/or portions of the data packet are received by the user device 106. In some embodiments, the data packet and/or portions thereof can be received by the communication subsystem 532 of the user device from the communication network 120.

After the data packet has been received, the process 800 proceeds to block 816, wherein control signal are generated to control the user interface of the user device 106 to provide the data packet and/or portions of the data packet to the user. In some embodiments, this can include generating control signals to control the operation of a screen, display, speaker, or the like to provide the data packet to the user in a human-consumable form. In some embodiments, block 816 can further include controlling the user interface to provide the data packet and/or one or more portions of the data packet to the user.

After the user interface is controlled to provide the data packet and/or one or more portions of the data packet to the user, the process 800 proceeds to block 818, wherein a user input is received by the user device 106. In some embodiments, the user input can be received by the user device 106 via the I/O subsystem 526. In some embodiments, the user input can be received in response to a request and/or question provided to the user with the data packet and/or with one or more portions of the data packet. In some embodiments, the I/O subsystem 526 can convert a physical input provided by the user into an electrical signal or digital form and can, in some embodiments, store the electrical signal or the digital form of the input.

After the user input has been received, the process 800 proceeds to block 820, wherein the user device 106 generates and/or sends a response to, for example, the content management server 102 and specifically to the evaluation system 406. In some embodiments, this can include the generation of an electrical message containing the user input and the sending of the electrical message, via the communication network 120 in the form of an electrical signal.

After the response has been generated and sent, the process 800 proceeds to block 822, wherein the response is received by the content management server 102, and specifically by the evaluation system 406. After the response is received, the process 800 proceeds to block 824, wherein the response is assessed. In some embodiments, this assessment can be performed according to the process 460 shown in FIG. 4C. After the response has been assessed, the process 800 proceeds to block 826 wherein assessment data is generated and sent. In some embodiments, the evaluation system 406 can generate assessment data based on the value characterizing response desirability and/or the assessment value generated in block 470 of FIG. 4C. In some embodiments, the assessment data can be sent to the user device 102 and/or the content delivery system 408 via, for example, the communications network 120.

Returning again to block 812, after the data packet has been provided to the user device 102, and, in some embodiments, wholly or partially simultaneous with some or all of steps 814-826, the process 800 proceeds to block 828, wherein a contingent recommendation is requested. In some embodiments, the contingent recommendation can include a plurality of potential next actions, and in some embodiments, each of the plurality of potential next actions can be based on at least one possible user response to the provided data packet.

After the contingent recommendation has been requested, the process 800 proceeds to block 830, wherein the request for generation of the contingent recommendation is received by the content customization system 402. After the request has been received, the process 800 proceeds to block 832, wherein the contingent recommendation is generated. The contingent recommendation can identify one or several actions that can be taken depending on the user response. In some embodiments, the contingent recommendation can identify one or several data packets to provide to the user in the event that the response is a desired response and/or an undesired response. In some embodiments, the contingent recommendation can indicate a termination of the content program in the event of a desired response or an undesired response.

In some embodiments, the contingent recommendation can be generated based on user data retrieved from the user profile database 301, based on an evidence model retrieved from the model database 309, and/or data packet information retrieved from the content library database 303. After the contingent recommendation has been generated, the process 800 proceeds to block 834, wherein the contingent recommendation is sent to the content delivery system 408. The content delivery system 408 receives the contingent recommendation as indicated in block 836, and then the process 800 proceeds to block 838, wherein the assessment data is received by the content delivery system 408 from the evaluation system 406.

After the assessment data has been received, the process 800 proceeds to decision block 840, wherein it is determined if additional data packets should be provided to the user device 106. In some embodiments, this can include determining, based on the received contingent recommendation and the received assessment data whether an additional data packet is recommended. If it is determined that an additional data packet should be provided to the user device 106, then the process 800 returns to block 810 and proceeds as outlined above. Alternatively, if it is determined that no additional data packet should be provided to the user device 106, then the process 800 can terminate. In some embodiments, the termination of the process 800 can coincide with the completion and/or termination of the content program. In such an embodiment, the evaluation system 406 can generate an assessment value characterizing user performance in completion of the content program. In some embodiments, this assessment value can be stored in one of the databases 104 such as, the user profile database 301.

Figure 9:
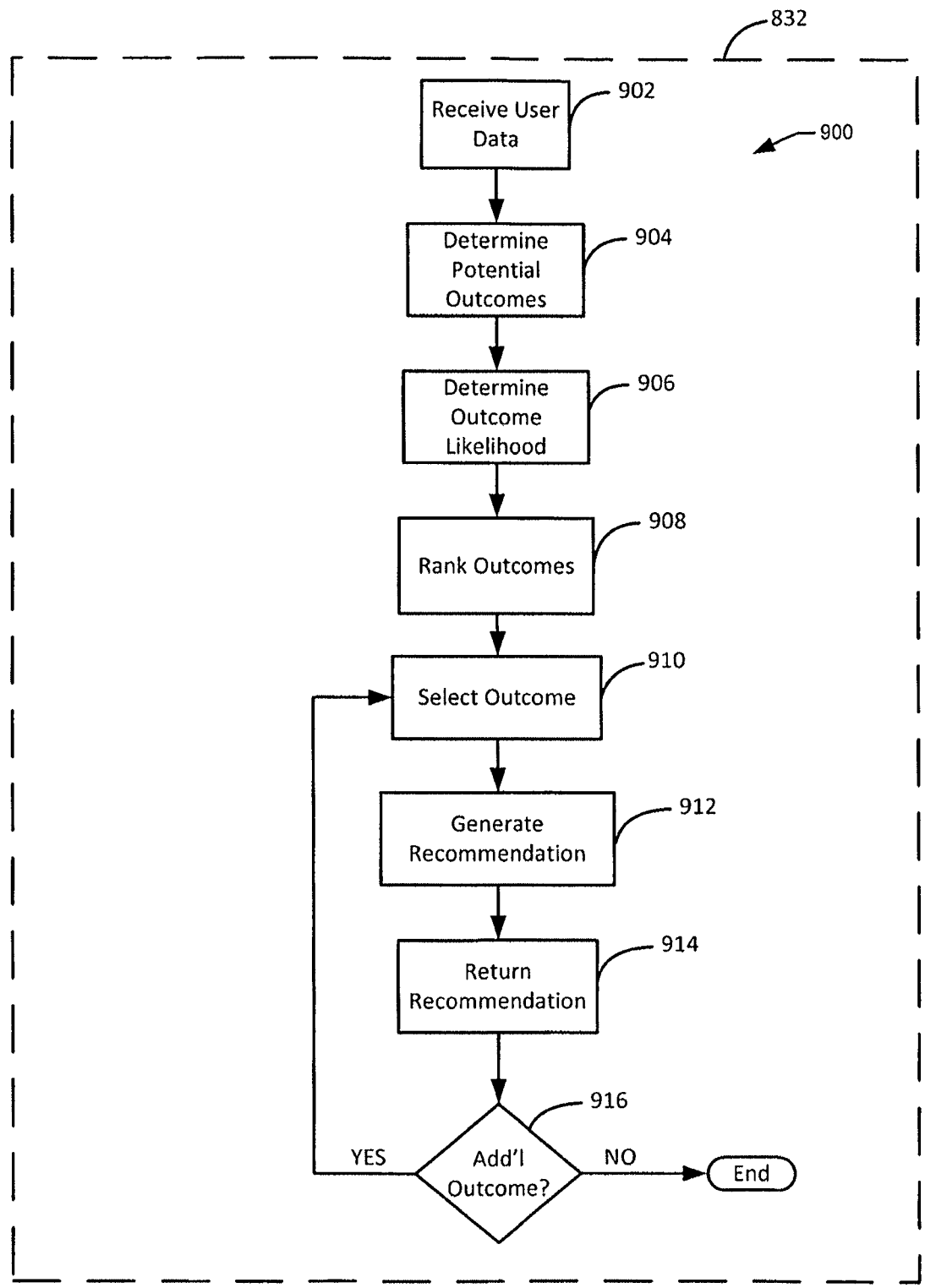
FIG. 9 is a flowchart illustrating one embodiment of a process for generating a contingent recommendation.

With reference now to FIG. 9, a flowchart illustrating one embodiment of a process 900 for generating a contingent recommendation is shown. In some embodiments, the process 900 can be performed as a part of, or in the place of block 832 of FIG. 8. The process 900 can be performed by the content customization system 402 and/or by the recommendation engine. The process 900 begins at block 902, wherein the user data is received. In some embodiments, the user data can be received simultaneous with the receipt of the request for the contingency recommendation, and in other embodiments, the user data can be received subsequent to the receipt of the request for the contingency recommendation. In one embodiment, for example, the content customization system 402 can request user data from the user profile database 301 after receiving a request for a contingency recommendation.

After the user data has been received, the process 900 proceeds to block 904 wherein potential outcomes to the provided data packet are determined. In some embodiments, the determination of potential outcomes to the provided data packet includes determining the potential outcomes of the assessment of the user response to the provided data packet. In some embodiments these outcomes to the provided data packet can include a first outcome for a desired response and the second outcome, for an undesired response. After the potential outcomes have been determined, the process 900 proceeds to block 906 wherein the likelihood of the potential outcomes to the provided data packet is determined. In some embodiments this likelihood can be determined with one of the model such as the evidence model and based on, for example information contained in the user data such as a user skill level or user ability level and/or information relating to the provided data packet such as, for example, data packet difficulty level and/or skill level. In some embodiments, determining the outcome likelihood can further include storing data identifying the likelihood of some or all of the potential outcomes.

After the outcome likelihood is been determined, the process 900 proceeds to block 908 wherein the outcomes to the provided data packet are ranked. In some embodiments, the outcomes to the provided data packet can be ranked according to their likelihood. In some embodiments, for example, the outcomes to the provided data packet can be ranked in descending order from the outcome having the highest likelihood to the outcome having the lowest likelihood. After the outcomes to the provided data packet have been ranked, the process 900 proceeds to block 910 wherein an outcome to the provided data packet is selected. In some embodiments, the outcome, of the set of available outcomes for selection, can be selected that has the highest likelihood of occurrence. In some embodiments, a value indicative of selection can be associated with the selected outcome and can be stored in one of the databases 104 such as the content library database 303.

After the outcome to the provided data packet has been selected, the process 900 proceeds to block 912 wherein the recommendation is generated. In some embodiments, the recommendation can be generated based on all or portions of the user data received at block 902, based on the evidence model, and/or based on any available data packets for providing to the user. In some embodiments, the generation recommendation can include determining which if any data packets are available for providing to the user, retrieving data packet information for those available data packets from, for example, the content library database 303, and applying the data packet information user data to the evidence model. In some embodiments, the generated recommendation can be specific to one or more of the potential outcomes of the data packet.

After the recommendation has been generated, the process 900 proceeds to block 914 wherein the recommendation is returned. In some embodiments, the recommendation can be returned to, for example, the content delivery system 408. After the recommendation has been returned, the process 900 proceeds to decision block 916 wherein it is determined if there is an additional outcome to the provided data packet. In some embodiments, this can include retrieving the set of identified potential outcomes to the provided data packet and determined if any of the potential outcomes to the provided data packet are not associated with the value indicative of selection. If there are no additional outcomes to the provided data packet, then the process 900 can terminate and/or can continue with block 834 of FIG. 8. If it is determined that there are additional outcomes to the provided data packet, then the process 900 can return to block 910 and can proceed as outlined above.

Figure 10:
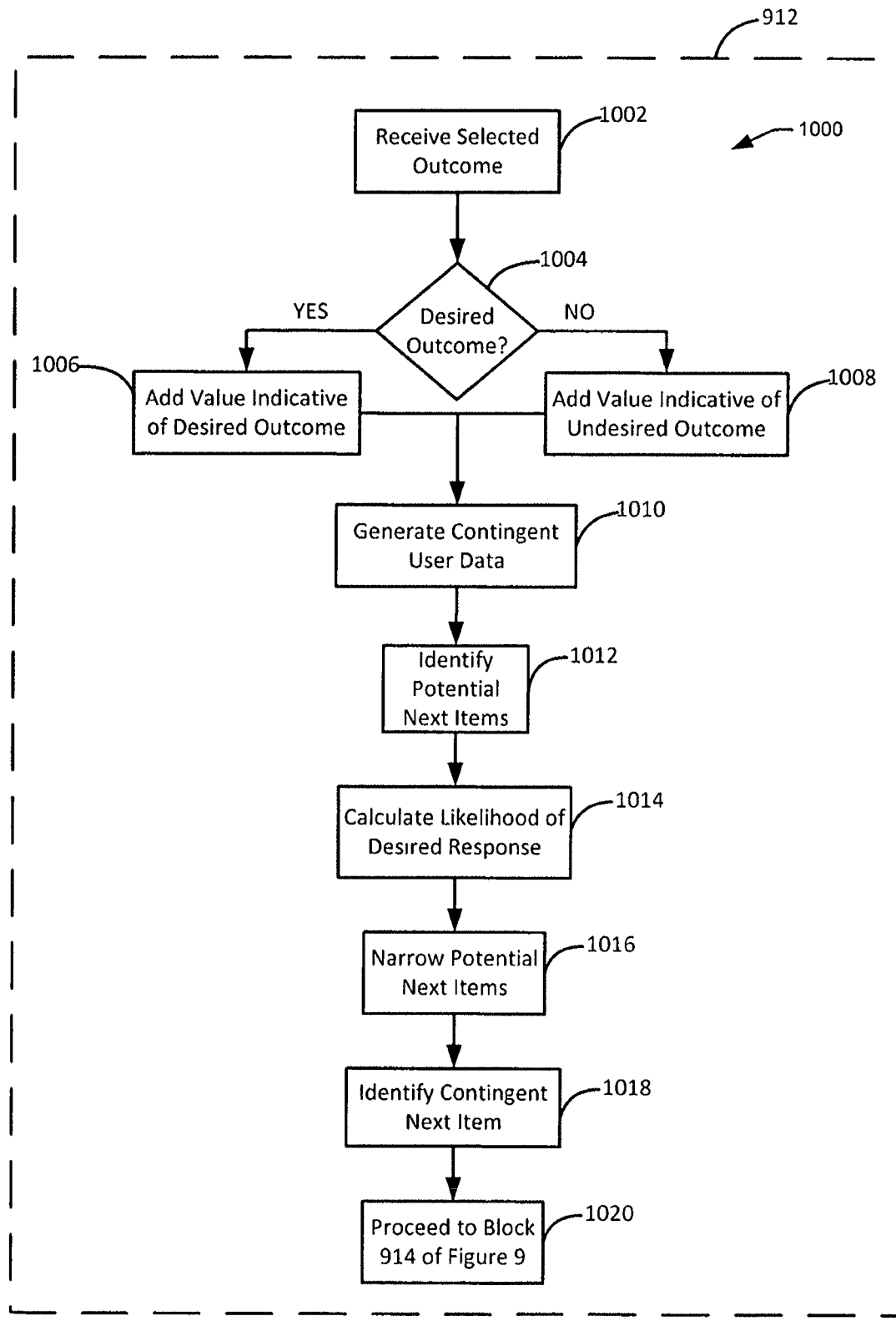
FIG. 10 is a flowchart illustrating one embodiment of a process for generating a contingent recommendation.

With reference now to FIG. 10, a flowchart illustrating one embodiment of a process 1000 for generating a recommendation is shown. In some embodiments, the process 1000 can be performed as a part of, or in place of block 912 of FIG. 9. The process 1000 can be performed by the content customization engine 402 or other component of the content management server 102 or the content distribution network 100. The process 1000 begins in block 1002 wherein the selected outcome is received. In some embodiments, this can include receiving the output of block 910.

After the selected outcome has been received, the process 1000 proceeds to decision state 1004 wherein it is determined if the selected outcome is a desired outcome. In some embodiments, this can include comparing the selected outcome to all or portions of the data packet including, for example, the response component of the data packet, and in some embodiments, this can include determining if the selected outcome is identified as a desired outcome.

If the selected outcome is a desired outcome, then the process 1000 proceeds to block 1006, wherein a value indicative of the selected outcome being a desired outcome is associated with the selected outcome. Alternatively, if the selected outcome is identified as an undesired outcome, then the process 1000 proceeds to block 1008 wherein a value indicative of the selected outcome being an undesired outcome is associated with the selected outcome. In some embodiments, these values can be associated with the selected outcome in one of the databases 104 such as, for example, the content library database 303.

After values indicative of outcome type have been associated with the selected outcome, the process 1000 proceeds to block 1010 wherein contingent user data is generated. In some embodiments, contingent user data can be user data updated to reflect the selected outcome. Specifically, and by way of example, and embodiments in which the selected outcome is a desired outcome, the contingent user data can be the user data updated to reflect receipt of the desired outcome. In some embodiments this can result in an increase of, for example, the skill level of the user identified in the contingent user data. Alternatively, and also by way of example, in embodiments in which the selected outcome is an undesired outcome, the contingent user data can be the user data updated to reflect receipt of the undesired outcome. In some embodiments, this can result in a decrease of, for example, the skill level of the user identified in the contingent user data. In some embodiments, the contingent user data can be stored in memory associated with the content customization system 402 such as cache or RAM memory.

After the contingent user data has been generated, the process 1000 proceeds to block 1012 wherein potential next items identified. In some embodiments, the potential next items can include the set of data packets that are part of the content program and that are available for providing to the user via the user device 106. In some embodiments, these data packets can be data packets that have not yet been provided to the user device 106. After the potential next items have been identified, the process 1000 proceeds to block 1014 where the likelihood of a desired response is determined and/or calculated for some or all of the potential next items. In some embodiments, the likelihood of a desired response can be determined by applying the contingent user data and data associated with the potential next items to the evidence model.

After the likelihood of a desired response is calculated, the process 1000 proceeds to block 1016 wherein the set of potential next items is narrowed. In some embodiments, the set of potential next items can be narrowed by comparing the likelihood of each of some or all of the potential next items to one or more threshold values. In some embodiments, these one or several thresholds can delineate between likelihoods of desired response that are too low, acceptable, or too high. In other words, these thresholds can be used to identify data packets that are too easy for the user, too hard for the user, or that match the user's skill level. In some embodiments, data packets identified as too easy or too hard are removed from the set of potential next items.

After the set of potential next items is narrowed, the process 1000 proceeds to block 1018, wherein a contingent next item is determined. In some embodiments, this can include selecting one of the set of potential next items as the contingent next item, which contingent next item is the next item recommended for providing to the user if the user response matches the outcomes selected in block 1002. In some embodiments, the contingent next item can be selected from the set of potential next items according to one or several selection rules. In some embodiments, these rules can specify one or several attributes of a contingent next item such as, for example, the subject matter of the contingent next item, the average amount of time to complete the contingent next item, a preference received from the supervisor device 110, or the like. In some embodiments, the contingent next item can be randomly selected from the set of potential next items.

In some embodiments, the identification of the contingent next item can further include storing the contingent next item in, for example, memory associated with the content customization system 402, the content delivery system 408, the content management server 102, and/or any other component of the content distribution network 100. After the contingent next item has been identified, the process 1000 proceeds to block 1020, and continues with block 914 of FIG. 9.

Figure 11:
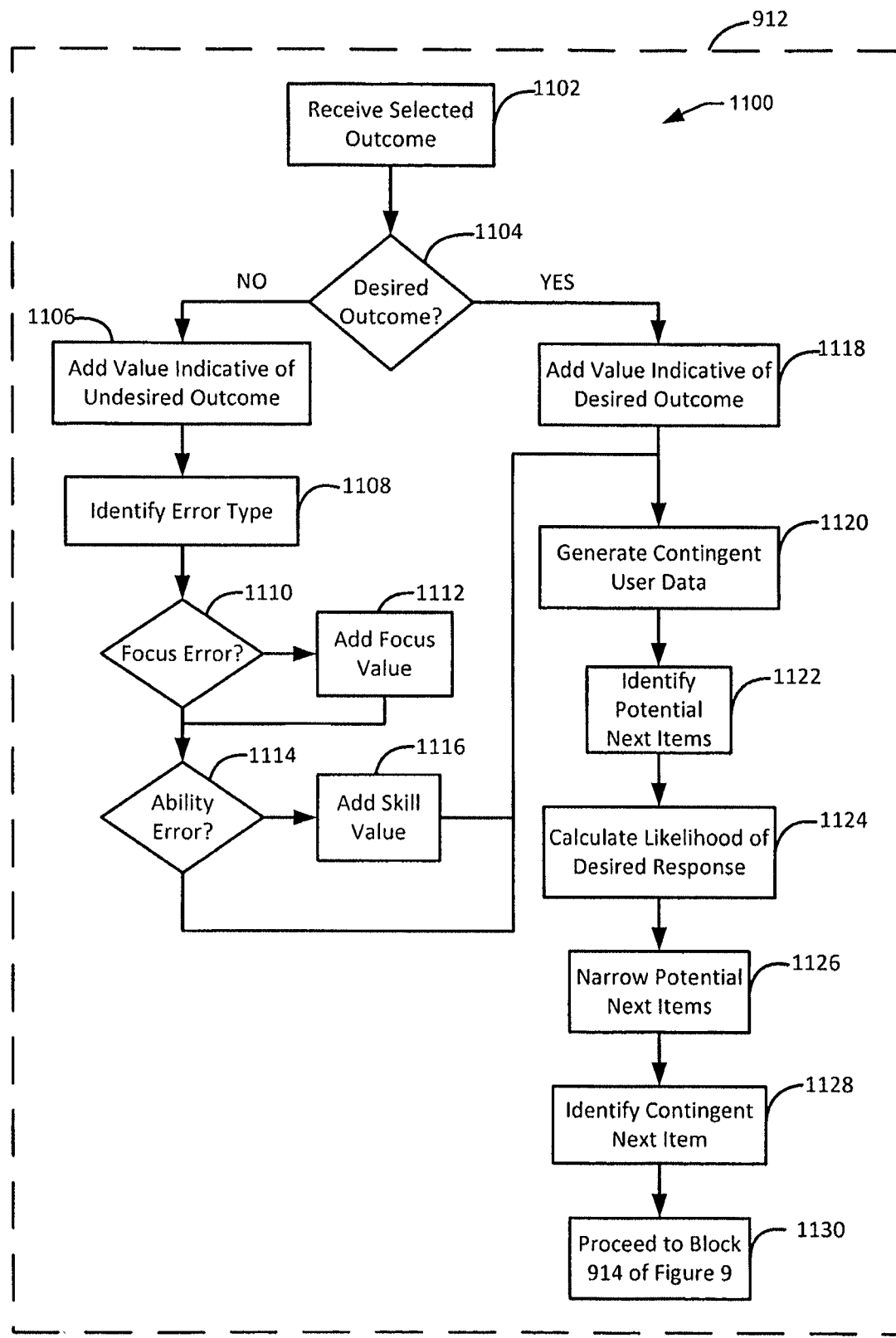
FIG. 11 is a flowchart illustrating one embodiment of a process for generating an adaptive contingent recommendation.

With reference now to FIG. 11, a flowchart illustrating one embodiment of a process 1100 for generating a recommendation is shown. In some embodiments, the process 1100 can be performed as a part of, or in place of block 912 of FIG. 9. The process 1100 can be performed by the content customization engine 402 or other component of the content management server 102 or the content distribution network 100. The process 1100 begins at block 1102 wherein the selected outcome is received. In some embodiments, this can include receiving the output of block 910.

After the selected outcome has been received, the process 1100 proceeds to decision state 1104 wherein it is determined if the selected outcome is a desired outcome. In some embodiments, this can include comparing the selected outcome to all or portions of the data packet including, for example, the response component of the data packet, and in some embodiments, this can include determining if the selected outcome is identified as a desired outcome.

If the selected outcome is an undesired outcome, then the process 1100 proceeds to block 1106, wherein a value indicative of the selected outcome being an undesired outcome is associated with the selected outcome. In some embodiments, this value can be associated with the selected outcome in one of the databases 104 such as, for example, the content library database 303.

After the value indicative of the undesired outcome has been added, the process 1100 proceeds to block 1108 wherein the error type is identified. In some embodiments, for example, one or several undesired outcomes can be associated with information identifying an error leading to that undesired outcome. These errors can include, for example, a lack of focus, a lack of comprehension and/or understanding, a lacking skill, or the like.

In some embodiments, the evaluation system 406 can be configured to identify such errors in the responses based on, for example, historic user data and/or information collected from the user device 106 during the time leading up to the user provided response. In some embodiments, when generating contingent recommendations, the content customization system 402 can identify outcomes associated with some or all of these errors and can then generate contingent next items for those outcomes associated with some or all of these errors.

In some embodiments, and referring specifically to block 1108, a selected outcome can be associated with an error type and can specifically be associated with one or several values identifying the associated error type. In some embodiments, the error type can be identified by identifying these one or several values associated with the selected outcome. After the error type of the selected outcome has been identified, the process 1100 proceeds to decision state 1110 wherein it is determined if the identified error type is a focus error. If it is determined that the identified error type is a focus error, then the process 1100 proceeds to block 1112 and a focus value is associated with the selected outcome. In some embodiments, the association of the focus value with the selected outcome identifies a selected outcome as resulting from a focus error.

After the focus value has been associated with the selected outcome, or returning to decision state 1110, if it is determined that the identified error type is not a focus error, then the process 1100 proceeds to decision state 1114 wherein it is determined if the identified error type is an ability error. If it is determined that the identified error type is an ability error, then the process 1100 proceeds to block 1116 and a skill value is associated with the selected outcome. In some embodiments, the association of a skill value with the selected outcome identifies the selected outcome as resulting from an ability error.

Returning again to decision state 1104, if it is determined that the selected outcome is associated with the desired outcome, then the process 1100 proceeds to block 1118, wherein a value indicative of the selected outcome being a desired outcome is associated with the selected outcome. In some embodiments, this value can be associated with the selected outcome in one of the databases 104 such as, for example, the content library database 303.

After the value indicative of the desired outcome has been associated with the selected outcome, or returning to block 1116, after the skill value has been added, or returning to decision state 1114, if it is determined that the identified error type is not an ability error, the process 1100 proceeds to block 1120, wherein contingent user data is generated. In some embodiments, contingent user data can be user data updated to reflect the selected outcome. Specifically, and by way of example, and embodiments in which the selected outcome is a desired outcome, the contingent user data can be the user data updated to reflect receipt of the desired outcome. In some embodiments this can result in an increase of, for example, the skill level of the user identified in the contingent user data. Alternatively, and also by way of example, in embodiments in which the selected outcome is an undesired outcome, the contingent user data can be the user data updated to reflect receipt of the undesired outcome. In some embodiments, this can result in a decrease of, for example, the skill level of the user identified in the contingent user data. In some embodiments, the contingent user data can be stored in memory associated with the content customization system 402 such as cache or RAM memory.

After the contingent user data has been generated, the process 1100 proceeds to block 1122 wherein potential next items identified. In some embodiments, the potential next items can include the set of data packets that are part of the content program and that are available for providing to the user via the user device 106. In some embodiments, these data packets can be data packets that have not yet been provided to the user device 106. After the potential next items have been identified, the process 1100 proceeds to block 1124 wherein the likelihood of a desired response is determined and/or calculated for some or all of the potential next items. In some embodiments, the likelihood of a desired response can be determined by applying the contingent user data and data associated with the potential next items to the evidence model.

After the likelihood of a desired response is calculated, the process 1100 proceeds to block 1126 wherein the set of potential next items is narrowed. In some embodiments, the set of potential next items can be narrowed by comparing the likelihood of each of some or all of the potential next items to one or more threshold values. In some embodiments, these one or several thresholds can delineate between likelihoods of desired response that are too low, acceptable, or too high. In other words, these thresholds can be used to identify data packets that are too easy for the user, too hard for the user, or that match the user's skill level. In some embodiments, data packets identified as too easy or too hard are removed from the set of potential next items.

After the set of potential next items is narrowed, the process 1100 proceeds to block 1128, wherein a contingent next item is determined. In some embodiments, this can include selecting one of the set of potential next items as the contingent next item, which contingent next item is the next item recommended for providing to the user if the user response matches the outcomes selected in block 1102. In some embodiments, the contingent next item can be selected from the set of potential next items according to one or several selection rules. In some embodiments, these rules can specify one or several attributes of a contingent next item such as, for example, the subject matter of the contingent next item, the average amount of time to complete the contingent next item, a preference received from the supervisor device 110, or the like. In some embodiments, the contingent next item can be randomly selected from the set of potential next items.

In some embodiments, the identification of the contingent next item can further include storing the contingent next item in, for example, memory associated with the content customization system 402, the content delivery system 408, the content management server 102, and/or any other component of the content distribution network 100. After the contingent next item has been identified, the process 1100 proceeds to block 1130, and continues with block 914 of FIG. 9.

Figure 12:
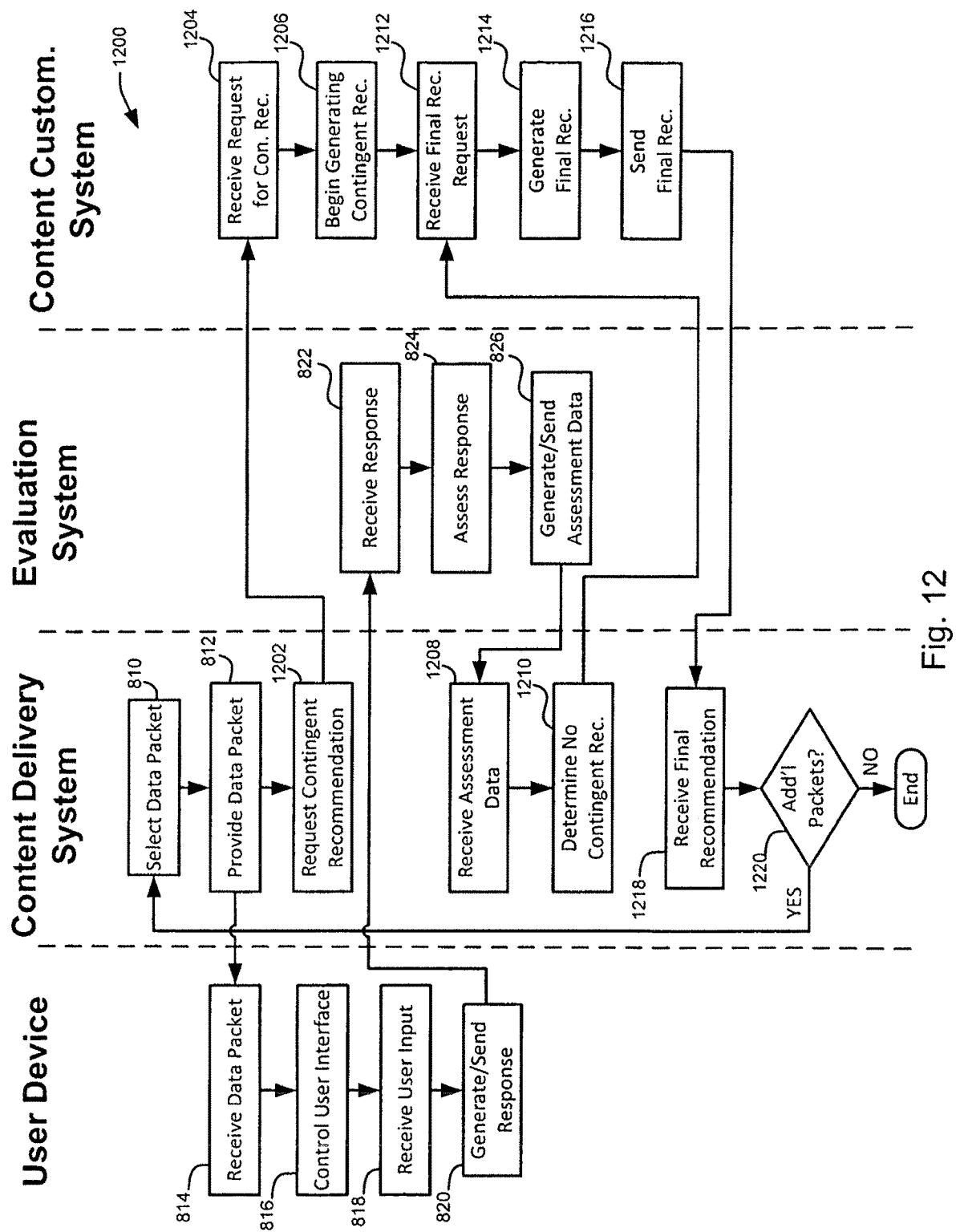
FIG. 12 is a swim lane diagram showing an embodiment of a process for decreasing latency in providing a data packet to a user device by interrupting the generation of a contingent recommendation.

With reference now to FIG. 12, a swim lane diagram showing another embodiment of a process 1200 for decreasing latency in providing a data packet to a user device subsequent to receipt of an electronic signal from the user device is shown. The process 1200 can be performed by the components of the content distribution network 100, and particularly by, for example, the content management server 102, one or several user devices 106, and/or one or several supervisor devices 110. Although process 1200 begins with block 810, in some embodiments, the process 1200 can further include the steps of block 802-808 of FIG. 8.

The process 1200 begins at block 810, wherein a data packet is selected. In some embodiments, the data packet can be selected based on information received from, for example, the content customization system and/or information stored within the user data retrieved from the user profile database 301.

After the data packet has been identified, the process 1200 proceeds to block 812, wherein the data packet is provided to, for example, the user device 106. In some embodiments, providing the data packet to the user device can include generating an electronic message containing the data packet and/or containing portions of the data packet. In some embodiments, the providing of the data packet to the steps depicted in process 440 of FIG. 4B. After the data packet has been provided to the user device 106, the process 1200 can proceed to block 814, wherein the data packet and/or portions of the data packet are received by the user device 106. In some embodiments, the data packet and/or portions thereof can be received by the communication subsystem 532 of the user device from the communication network 120.

After the data packet has been received, the process 1200 proceeds to block 816, wherein control signal are generated to control the user interface of the user device 106 to provide the data packet and/or portions of the data packet to the user. In some embodiments, this can include generating control signals to control the operation of a screen, display, speaker, or the like to provide the data packet to the user in a human-consumable form. In some embodiments, block 816 can further include controlling the user interface to provide the data packet and/or one or more portions of the data packet to the user.

After the user interface is controlled to provide the data packet and/or one or more portions of the data packet to the user, the process 1200 proceeds to block 818, wherein a user input is received by the user device 106. In some embodiments, the user input can be received by the user device 106 via the I/O subsystem 526. In some embodiments, the user input can be received in response to a request and/or question provided to the user with the data packet and/or with one or more portions of the data packet. In some embodiments, the I/O subsystem 526 can convert a physical input provided by the user into an electrical signal or digital form and can, in some embodiments, store the electrical signal or the digital form of the input.

After the user input has been received, the process 1200 proceeds to block 820, wherein the user device 106 generates and/or sends a response to, for example, the content management server 102 and specifically to the evaluation system 406. In some embodiments, this can include the generation of an electrical message containing the user input and the sending of the electrical message, via the communication network 120 in the form of an electrical signal.

After the response has been generated and sent, the process 1200 proceeds to block 822, wherein the response is received by the content management server 102, and specifically by the evaluation system 406. After the response is received, the process 1200 proceeds to block 824, wherein the response is assessed. In some embodiments, this assessment can be performed according to the process 460 shown in FIG. 4C. After the response has been assessed, the process 1200 proceeds to block 826 wherein assessment data is generated and sent. In some embodiments, the evaluation system 406 can generate assessment data based on the value characterizing response desirability and/or the assessment value generated in block 470 of FIG. 4C. In some embodiments, the assessment data can be sent to the user device 102 and/or the content delivery system 408 via, for example, the communications network 120.

After the assessment data is generated and sent, the process 1200 proceeds to block 1208, wherein the assessment data is received by the content delivery system 408. After the assessment data has been received, the process 1200 proceeds to block 1210, wherein it is determined if the contingent recommendation has been received. In some embodiments, for example, the response can be received and assessed before the receipt of the contingent recommendation. FIG. 8 depicts an embodiment in which the contingent recommendation is received before the receipt of the assessment data for the response and FIG. 12 depicts an embodiment in which the contingent recommendation is not received before the receipt of the assessment data, and thus, block 1210 indicates the determination that the contingent recommendation has not been received. In some embodiments, if it is determined that the contingent recommendation has not been received, block 1210 can further include the generation of a request for a final recommendation based on the received response and the assessment data, and the sending of this request to the content customization system.

Returning again to block 812, after the data packet has been provided to the user device 102, and, in some embodiments, wholly or partially simultaneous with some or all of steps 814-826, the process 1200 proceeds to block 1202, wherein a contingent recommendation is requested. In some embodiments, the contingent recommendation can include a plurality of potential next actions, and in some embodiments, each of the plurality of potential next actions can be based on at least one possible user response to the provided data packet.

After the contingent recommendation has been requested, the process 1200 proceeds to block 1204 wherein the request for generation of the contingent recommendation is received by the content customization system 402. After the request has been received, the process 1200 proceeds to block 1206, wherein the generation of the contingent recommendation is initiated. The contingent recommendation can identify one or several actions that can be taken depending on the user response. In some embodiments, the contingent recommendation can identify one or several data packets to provide to the user in the event that the response is a desired response and/or an undesired response. In some embodiments, the contingent recommendation can indicate a termination of the content program in the event of a desired response or an undesired response.

In some embodiments, the contingent recommendation can be generated based on user data retrieved from the user profile database 301, based on an evidence model retrieved from the model database 309, and/or data packet information retrieved from the content library database 303. During the generation of the contingency recommendation, a request for generation of the final recommendation can be received as indicated in block 1212.

After the request for the generation of the final recommendation has been received, the process 1200 proceeds to block 1214, wherein the final recommendation is generated. In some embodiments, the generation of the final recommendation can include the termination of the generation of the contingent recommendation. After the generation of the contingent recommendation has been stopped, the content customization system 402 can compare the received request for generation of the final recommendation to any already selected and evaluated outcomes. In some embodiments, if there is a match between the request and the already selected and evaluated outcome, then the generation of the final recommendation can include the retrieval of the identified contingent next item for the outcome associated with the request for generation of the final recommendation. If there is no match between the request for the generation of the final recommendation and any already selected and evaluated outcomes, then the generation of the final recommendation can proceed according to process 1000 depicted in FIG. 10, but with the outcome associated with the provided response being the selected outcome.

After the final recommendation has been generated, the process 1200 proceeds to block 1216, wherein the final recommendation is sent to the content delivery system 408. The content delivery system 408 receives the contingent recommendation as indicated in block 1218, and then the process 1200 proceeds to decision block 1220, wherein it is determined if additional data packets should be provided to the user device 106. In some embodiments, this can include determining, based on the received contingent recommendation and the received assessment data whether an additional data packet is recommended. If it is determined that an additional data packet should be provided to the user device 106, then the process 1200 returns to block 810 and proceeds as outlined above. Alternatively, if it is determined that no additional data packet should be provided to the user device 106, then the process 1200 can term in ate. In some embodiments, the termination of the process 1200 can coincide with the completion and/or termination of the content program. In such an embodiment, the evaluation system 406 can generate an assessment value characterizing user performance in completion of the content program. In some embodiments, this assessment value can be stored in one of the databases 104 such as, the user profile database 301.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to poliable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A system comprising:
 a server comprising a computing device coupled to a network and including at least one processor executing within a memory instructions which, when executed, cause the system to:
  select, from a user profile database coupled to the network, a unique identifier for a user;
  generate, based on at least one historic attribute associated in the user profile database with the unique identifier, a model predicting a likelihood of inputting, by the user, a correct response to a question stored in association with a response data as a data packet, and further associated with a learning material within a content library database;
  identify, based on the model, a plurality of potential next actions according to at least one possible user response to the question, input by the user;
  transmit the question through the network to be displayed on a user device operated by the user;
  receive a user response to the question, input by the user; and
  automatically select a next action from the plurality of potential next actions, according to the user response, further comprising:
   updating, based on the user response to the question:
    a user profile, in the user profile database, for the user, and
    an updated plurality of potential next actions;
   selecting, from the updated plurality of potential next actions, an updated next action for the user; and generating a contingent recommendation according to the updated next action; and transmit the contingent recommendation through the network to the user device, wherein the contingent recommendation is generated as a function of the model.

2. The system of claim 1, wherein the instructions further cause the system to update the user profile database to reflect a potential user response to the question.

3. The system of claim 1, wherein the instructions further cause the system to transmit, in association with the question, a request for a response to the question.

4. The system of claim 1, wherein the next action is selected according to a selection criteria determined according to one of several received responses from at least one previous user.

5. The system of claim 1, wherein the next action is selected by eliminating at least one of the potential next actions.

6. The system of claim 5, wherein the at least one of the potential next actions is eliminated according to the model predicting a likelihood of an incorrect response above a threshold.

7. The system of claim 5, wherein the at least one of the potential next actions is eliminated according to the model predicting a likelihood of the correct response below a threshold.

8. The system of claim 1, wherein the plurality of potential next actions are stored in the content library database.

9. The system of claim 1, wherein each of the plurality of potential next actions are stored in the data packet.

10. The system of claim 1, wherein the instructions further cause the system to update a skill level for the user in the user profile database, according to the user response.

11. A method comprising the steps of:

selecting, by a server comprising a computing device coupled to a network and including at least one processor executing instructions within a memory, from a user profile database coupled to the network, a unique identifier for a user;

generating, by the server, based on at least one historic attribute associated in the user profile database with the unique identifier, a model predicting a likelihood of inputting, by the user, a correct response to a question stored in association with a response data as a data packet, and further associated with a learning material within a content library database;

identifying, by the server, based on the model, a plurality of potential next actions according to at least one possible user response to the question, input by the user;

transmitting, by the server, the question through the network to be displayed on a user device operated by the user;

receiving, by the server, a user response to the question, input by the user; and automatically selecting, by the server, a next action from the plurality of potential next actions, according to the user response, further comprising the steps of:

updating, based on the user response to the question:
a user profile, in the user profile database, for the user, and
an updated plurality of potential next actions;

selecting, from the updated plurality of potential next actions, an updated next action for the user; and generating a contingent recommendation according to the updated next action; and transmitting, by the server, the contingent recommendation through the network to the user device, wherein the contingent recommendation is generated as a function of the model.

12. The method of claim 11, further comprising the step of updating, by the server, the user profile database to reflect a potential user response to the question.

13. The method of claim 11, further comprising the step of transmitting, by the server, in association with the question, a request for a response to the question.

14. The method of claim 11, wherein the next action is selected according to a selection criteria determined according to one of several received responses from at least one previous user.

15. The method of claim 11, wherein the next action is selected by eliminating at least one of the potential next actions.

16. The method of claim 15, wherein the at least one of the potential next actions is eliminated according to the model predicting a likelihood of an incorrect response above a threshold.

17. The method of claim 15, wherein the at least one of the potential next actions is eliminated according to the model predicting a likelihood of the correct response below a threshold.

18. The method of claim 11, wherein the plurality of potential next actions are stored in the content library database.

19. The method of claim 11, wherein each of the plurality of potential next actions are stored in the data packet.

20. The method of claim 11, wherein the instructions further cause the system to update a skill level for the user in the user profile database, according to the user response.

* * * * *